United States Patent Office 2,695,100
Patented Nov. 23, 1954

2,695,100

SYLVITE CONCENTRATION PROCESS

James A. Barr, Jr., Mount Pleasant, Tenn., and Fred H. Bunge, La Grange, Ill., assignors to Armour and Company, Chicago, Ill., a corporation of Illinois No Drawing. Application January 12, 1952,
Serial No. 266,242

7 Claims. (Cl. 209—166)

This invention relates to the concentration of sylvite from sylvinite. More particularly, this invention relates to an improved method of effecting the separation of sylvite from sylvite-bearing ores by froth-flotation with a cationic reagent and an auxiliary reagent of the polysaccharide type.

In the usual method for the flotation recovery of sylvite from sylvinite ores, the ore is ground to the desired fineness and is passed through flotation cells containing brine, an auxiliary agent, a collecting reagent, and desirably a frothing reagent. Air is then introduced into the cells to bring about the formation of froth and floating of the collected sylvite, and the flotation layer is skimmed off and recovered as sylvite. Meanwhile the halite and other unwanted mineral are passed along as underflow or tailings and are removed from the cells.

In recovering sylvite ore, considerable difficulty is experienced by reason of the slimes which exist in the ores. The slimes prevent much of the collecting reagent from reaching the sylvite, greatly increase reagent consumption, and thus reduce recovery of the sylvite. To counteract the undesirable action of the slimes, an auxiliary reagent for depressing the slimes is usually added in addition to the collecting reagent. Thus in the presence of an auxiliary agent, the desired collecting action goes forward effectively without interference from the slimes. Heretofore, the most generally used auxiliary reagents have been soluble starch, various proteins, and cellulosic materials.

An object of this invention is to provide a method of treating sylvinite ore so as to recover therefrom a relatively pure sylvite concentrate, the recovery being effected without substantial interference from slimes. Another object of this invention is to provide a new and highly effective flotation process employing the combination of a collecting reagent and an auxiliary reagent of the polysaccharide type. A further object of this invention is to provide a reliable method of concentrating sylvinite ores involving the use of readily avialable, stable flotation reagents. Other specific objects and advantages will be apparent hereinafter.

We have discovered that, in the recovery of sylvite from svlvinite ores by froth-flotation, we may obtain extremely high yields of sylvite by maintaining in the cell during flotation a cationic collector and an auxiliary reagent comprising a polymer of dehydrated starch.

In the practice of our method, sylvinite ore is formed into a pulp in an aqueous solution of the soluble ore constituents (preferably after a preliminary desliming step), the polysaccharide is added to condition the slimes, and a cationic collector is dispersed throughout the pulp which is then subjected to flotation treatment to concentrate the desired sylvite. The separation obtained is highly satisfactory with respect to both the degree of concentration of sylvite product and the amount of reagents required.

The auxiliary reagent which we employ is a polysaccharide derived from carbohydrate sources. One method of preparing this polysaccharide is described in the patent to Durand, No. 2,563,014, issued August 7, 1951. In accordance with this patent, preparation of the polysaccharide involves dehydrating a starch conversion liquor to isolate the solid material therein and heating the isolated solid under conditions conductive to polymerization. In particular, this preparation comprises dehydrating a starch conversion liquor having a dextrose equivalent value of less than 40 to a moisture content of 10 percent, heating the dried product in the presence of an acid catalyst at pH 2 to 3 to permit chemical condensation, and continuously removing water vapor formed during heating. The product, sometimes referred to herein as "polysaccharide," may be readily dissolved in water or sylvinite brine for incorporation within the flotation circuit. We have observed that the polysaccharide, a polymer of dehydrated starch, is chemically unlike starches and dextrins. The term "polymer of dehydrated starch" also refers herein to the polysaccharide produced by the process described in U. S. 2,563,014 or by any other suitable method. The amount of polysaccharide required in our process will vary depending on the type of ore but preferably will be from 1.0 to 2.0 pounds per ton of pulp solids although lesser amounts will serve. Greater amounts would ordinarily be unnecessary.

We have not as yet determined the reason for the effectiveness of our new concentration process; it appears that the polysaccharide serves to segregate the slimes and to prevent slime particles from taking up or exhausting the collecting reagent. However, there may be other controlling factors which are also operative in providing the desired concentration of sylvite. In the preferred practice of our invention the polysaccharide is added to the ore pulp prior to the addition of the collecting reagent.

As collecting reagents we may use any of the higher aliphatic cationic collectors, preferably the higher aliphatic amines or amine salts. The aliphatic amines employed contain 8 or more carbon atoms, and any aliphatic amine having from 8 to 22 carbon atoms is satisfactory, although amines having higher carbon chain lengths may be used. The amines may be primary, and may be saturated or unsaturated. Typical amines are dodecyl, tetradecyl, hexadecyl, octadecyl, octadecenyl, and octadecadienyl amines. Mixtures of such amines or amines made from fatty acid mixtures obtained from naturally-occurring oils may be employed. The salts of the aliphatic amines are particularly useful as, for example, the amine acetate, chloride, etc. The amount of collector employed will vary somewhat for different ores and different types of brine and usually 0.2 to 1.0 pounds per ton of pulp solids will be quite satisfactory although smaller amounts will suffice. Greater amounts of collector will be unnecessary in most cases.

In accordance with our process, the collecting agent is incorporated in the flotation brine in the form of a molecular or a colloidal dispersion. Desirably, a suitable dispersion may be formed by adding the collector to the flotation circuit as a 5% aqueous solution.

In addition to a collecting reagent, a frothing reagent such as pine oil may be employed in the flotation brine if desired.

Of the sylvinite ores which may be concentrated by our process we may mention the ores found in the Carlsbad, New Mexico region and the Hartz salts which are found in the German potash deposits. Any similar ores bearing potassium chloride and sodium chloride may likewise be concentrated.

The following examples may be set out as illustrative of our invention:

Example I

Sylvinite ore from the Carlsbad, New Mexico area was crushed to −20 mesh and deslimed. The deslimed ore was then pulped in a flotation cell with a saturated brine solution. The pulp thus formed was conditioned for one minute with an aqueous solution of the polysaccharide produced by the process disclosed in U. S. Patent No. 2,563,014, and then conditioned for an additional one-half minute with octadecylamine acetate and pine oil. The amounts of these reagents in pounds per ton of pulp solids were: polysaccharide, 1.0; octadecylamine acetate, 0.50; and pine oil, 0.09. After conditioning, the pulp was submitted to froth-flotation treatment for 2½ minutes, and to first and second cleaners, each for two minutes.

The metallurgical results follow:

| Product | Weight Percent | Percent K₂O | Percent K₂O Recovery |
|---|---|---|---|
| Concentrate | 37.0 | 60.30 | 95.8 |
| Middlings | 5.7 | 11.32 | 2.8 |
| Tailings | 57.3 | 0.57 | 1.4 |
| Composite | 100.0 | 23.28 | 100.0 |

*Example II*

A quantity of Hartz salts from the German deposits was crushed and deslimed and then pulped in a flotation cell with a saturated brine solution. The pulp thus formed was conditioned for two minutes with an aqueous solution of polysaccharide of the type referred to in Example I, and then conditioned for one-half minute with octadecylamine acetate and pine oil. The amounts of reagents used in pounds per ton of pulp solids were: Polysaccharide, 2.0; octadecylamine acetate, 0.50; and pine oil, 0.18. After conditioning, the pulp was subjected to froth-flotation for two minutes. The concentrated froth was then subjected for one minute each, to first and second cleaners each containing 0.09 pounds of pine oil per ton of pulp solids.

The metallurgical results follow:

| Product | Weight Percent | Percent K₂O | Percent K₂O Recovery |
|---|---|---|---|
| Concentrate | 23.8 | 49.27 | 93.2 |
| 1st Cleaner Tailings | 2.7 | 4.42 | 1.0 |
| 2nd Cleaner Tailings | 1.0 | 8.81 | 0.7 |
| Tailings | 72.5 | 0.88 | 5.1 |
| Composite | 100.0 | 12.58 | 100.0 |

From the foregoing examples it will be observed that our new concentration process results in a high recovery of sylvite. It is also notable that our process is economical and may be practiced with minimum effort on the part of the operator.

While in the foregoing description we have set forth specific details of our process for the purpose of illustrating certain modes of carrying out the invention, it will be understood that such details may be varied widely by those skilled in the art without departing from the spirit of our invention.

We claim:

1. In the process of concentrating sylvite from a sylvinite ore in a pulp formed with a saturated aqueous solution of the soluble ore constituents, the steps of conditioning said pulp with a polymer of dehydrated starch and a higher aliphatic cationic collector and separating sylvite from the ore by froth flotation.

2. A process for separating sylvite from sylvite-bearing ores, comprising subjecting to froth-flotation a pulp of sylvite-bearing ores in a saturated brine thereof conditioned with a polymer of dehydrated starch and a higher aliphatic cationic collector.

3. A process of separating sylvite from a sylvinite ore in a pulp formed with a saturated aqueous solution of the soluble ore constituents, comprising distributing in said pulp a water-soluble polymer of dehydrated starch and a higher aliphatic cationic collector, and subjecting the pulp to froth flotation to remove the desired sylvite.

4. A process for separating sylvite from sylvite-bearing ores, comprising subjecting to froth-flotation a pulp of sylvite-bearing ores in a saturated brine thereof conditioned with a polymer of a dehydrated starch conversion liquor and a compound selected from the class consisting of aliphatic amines having at least 8 carbon atoms and their salts.

5. A process for separating potassium chloride from a mixture of potassium chloride and sodium chloride, comprising subjecting to froth-flotation a pulp of said mixture in its saturated brine containing a polymer of dehydrated starch and a higher aliphatic cationic collector.

6. A process for concentrating potassium chloride from a mixture of potassium chloride and sodium chloride, comprising subjecting to froth-flotation a pulp of said mixture in its saturated brine containing a polymer of a dehydrated starch conversion liquor and a collector selected from aliphatic amines having at least 8 carbon atoms and the salts thereof.

7. A process for concentrating sylvite from sylvinite, comprising subjecting to froth-flotation a pulp of sylvite-bearing ores in a saturated brine thereof conditioned with a polymer of a dehydrated starch conversion liquor and octadecylamine acetate.

References Cited in the file of this patent

UNITED STATES PATENTS

| Number | Name | Date |
|---|---|---|
| 2,288,497 | Tartaron et al. | June 30, 1942 |
| 2,322,789 | Cole | June 29, 1943 |